(12) United States Patent
Van Gerwen et al.

(10) Patent No.: US 8,741,367 B2
(45) Date of Patent: Jun. 3, 2014

(54) FOOD PRODUCT FORMING APPARATUS AND PROCESS

(75) Inventors: Hendrikus Petrus Gerardus Van Gerwen, VT Someren (NL); Jacobus Johannes Maria Van Der Laak, PM Milheeze (NL)

(73) Assignee: CFS Bakel B.V., Bakel (NL)

(*) Notice: Subject to any disclaimer, the term of this patent is extended or adjusted under 35 U.S.C. 154(b) by 288 days.

(21) Appl. No.: 13/001,672

(22) PCT Filed: Jun. 29, 2009

(86) PCT No.: PCT/EP2009/004676
§ 371 (c)(1),
(2), (4) Date: Mar. 11, 2011

(87) PCT Pub. No.: WO2010/000430
PCT Pub. Date: Jan. 7, 2010

(65) Prior Publication Data
US 2011/0151082 A1 Jun. 23, 2011

(30) Foreign Application Priority Data
Jul. 4, 2008 (EP) .................................... 08012165

(51) Int. Cl.
*A23P 1/10* (2006.01)
*B29C 33/46* (2006.01)
(52) U.S. Cl.
USPC ........... 426/389; 426/312; 426/646; 426/511; 426/513; 425/437; 425/444
(58) Field of Classification Search
CPC ..... A47J 43/20; A22C 7/0038; A22C 7/0076; A22C 7/0084; A23L 1/0073; A23L 1/3177; A23P 1/105; B29C 33/46; B29C 45/43; B29C 33/442

USPC .............. 426/389, 312, 646, 510–513, 520; 425/225, 227, 229, 231, 279, 282, 285, 425/351, 437, 444
See application file for complete search history.

(56) References Cited

U.S. PATENT DOCUMENTS 2,688,940 A * 9/1954 Zeun .............................. 425/578
2,763,026 A 9/1956 Holly
(Continued)

FOREIGN PATENT DOCUMENTS

EP 0818148 A1 1/1998
FR 2387609 A 11/1978
(Continued)

OTHER PUBLICATIONS

International Search Report and Written Opinion Application No. PCT/EP2009/004676 filed on Jun. 29, 2009, published as WO2010/000430 on Jan. 7, 2010.
(Continued)

*Primary Examiner* — Drew E Becker
(74) *Attorney, Agent, or Firm* — The Dobrusin Law Firm, P.C.

(57) ABSTRACT

The present invention is related to a food product-forming apparatus, with a movable form-body, in which the food product is formed, and a knock out cup, which executes a knock-out-movement, that removes the food product from the form-body, whereas the knock out cup comprises an at least partially permeable bottom, through which a fluid-medium can be ejected and whereas, during the knock-out movement, a fluid-medium cushion is created, at least temporarily beneath the permeable bottom. The present invention furthermore comprises a process for the production of food products.

19 Claims, 22 Drawing Sheets

(56) References Cited

U.S. PATENT DOCUMENTS

| | | | |
|---|---|---|---|
| 3,008,594 A * | 11/1961 | Toennies | 414/411 |
| 3,177,524 A | 4/1965 | Gause | |
| 3,213,486 A | 10/1965 | Blake | |
| 3,347,176 A | 10/1967 | Hall | |
| 3,724,026 A | 4/1973 | Gernandt | |
| 3,750,232 A | 8/1973 | Holly | |
| 3,913,175 A * | 10/1975 | Peterson | 426/513 |
| 3,991,440 A | 11/1976 | Hendrickson | |
| 3,998,574 A | 12/1976 | Blake | |
| 4,091,504 A * | 5/1978 | Wong | 425/377 |
| 4,129,159 A * | 12/1978 | Whetstone | 141/1 |
| 4,212,609 A * | 7/1980 | Fay | 425/100 |
| 4,282,258 A * | 8/1981 | Forkner | 426/100 |
| 4,418,446 A | 12/1983 | Sandberg | |
| 4,578,027 A * | 3/1986 | Koppa et al. | 425/298 |
| 4,646,385 A * | 3/1987 | Roberts et al. | 426/513 |
| 4,987,643 A | 1/1991 | Powers | |
| 5,250,314 A * | 10/1993 | Jones | 426/512 |
| 5,645,869 A * | 7/1997 | Riubrugent | 425/149 |
| 6,368,092 B1 | 4/2002 | Lindee | |
| 7,655,173 B2 * | 2/2010 | Azzar et al. | 264/335 |
| 7,824,172 B2 * | 11/2010 | Azzar et al. | 425/437 |
| 7,824,599 B2 * | 11/2010 | Azzar et al. | 264/334 |
| 7,931,461 B2 * | 4/2011 | van der Eerden et al. | 425/363 |
| 8,469,697 B2 * | 6/2013 | Lindee et al. | 425/556 |
| 2002/0083845 A1 * | 7/2002 | Yung | 99/324 |
| 2005/0009696 A1 | 1/2005 | Mao | |
| 2005/0013895 A1 * | 1/2005 | Azzar | 425/572 |
| 2005/0042321 A1 | 2/2005 | LaBruno | |
| 2005/0214399 A1 | 9/2005 | LaBruno et al. | |
| 2005/0220932 A1 * | 10/2005 | van der Eerden et al. | 426/1 |
| 2006/0013916 A1 * | 1/2006 | Azzar et al. | 425/437 |
| 2013/0045294 A1 | 2/2013 | Van Gerwen | |

FOREIGN PATENT DOCUMENTS

| | | |
|---|---|---|
| GB | 2312641 A | 11/1997 |
| JP | 55-39988 A | 3/1980 |
| JP | 56-35026 A | 4/1981 |
| JP | 2001-1211811 A | 8/2001 |
| JP | 2007-536927 A | 12/2007 |
| WO | 2004/002229 A | 1/2004 |
| WO | 2005/009696 A1 | 2/2005 |
| WO | 2006/020139 A1 | 2/2006 |
| WO | 2064956 A1 | 6/2009 |
| WO | 2010/110655 A1 | 9/2010 |
| WO | 2012/055454 A2 | 5/2012 |
| WO | 2012/059188 A1 | 5/2012 |

OTHER PUBLICATIONS

Preliminary Report on Patentability, Dated Nov. 2, 2010, Serial No. PCT/EP2009/004676.
Related U.S. Appl. No. 13/641,249, filed Oct. 15, 2012, published as US2013/0045294 publication date Feb. 21, 2013.
Related U.S. Appl. No. 13/819,071, filed Feb. 26, 2013, published as 2012/055454, publication date May 3, 2012.
Potentially related U.S. Appl. No. 13/883,152, filed May 2, 2013, Published as WO2012/059188A1.

* cited by examiner

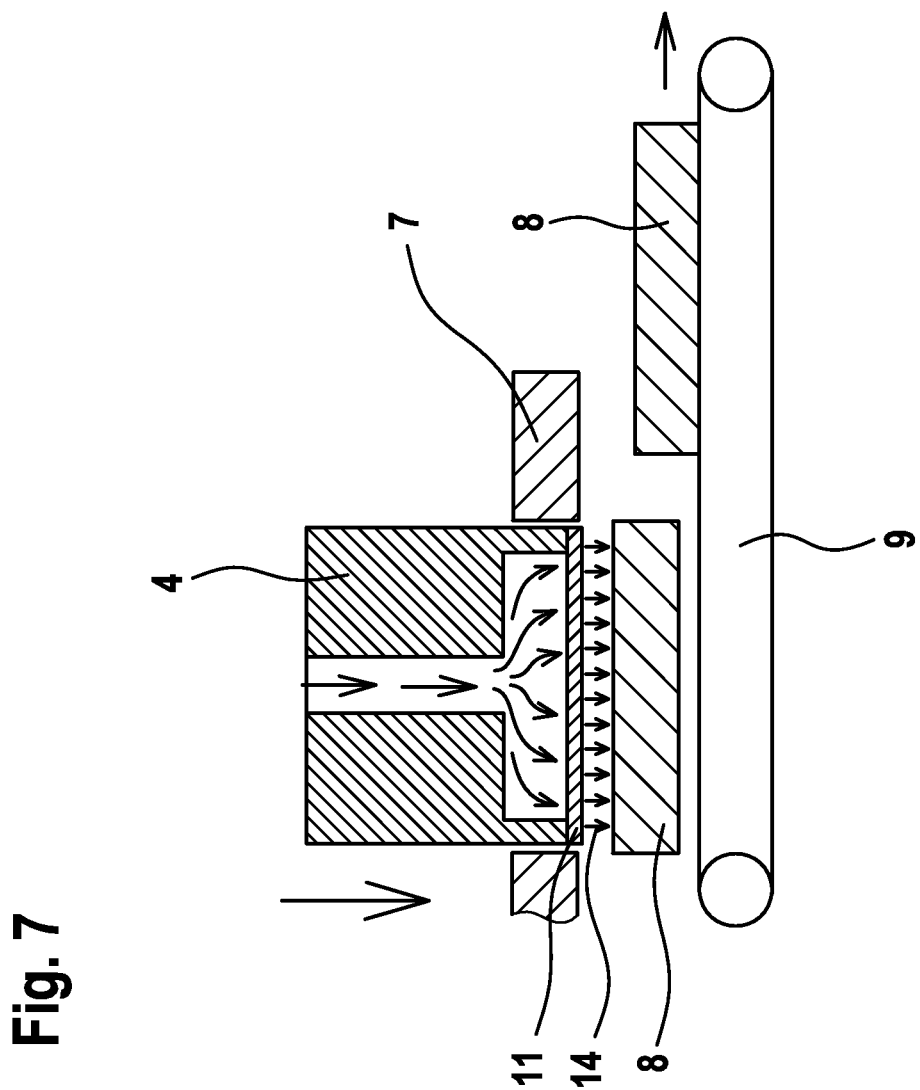

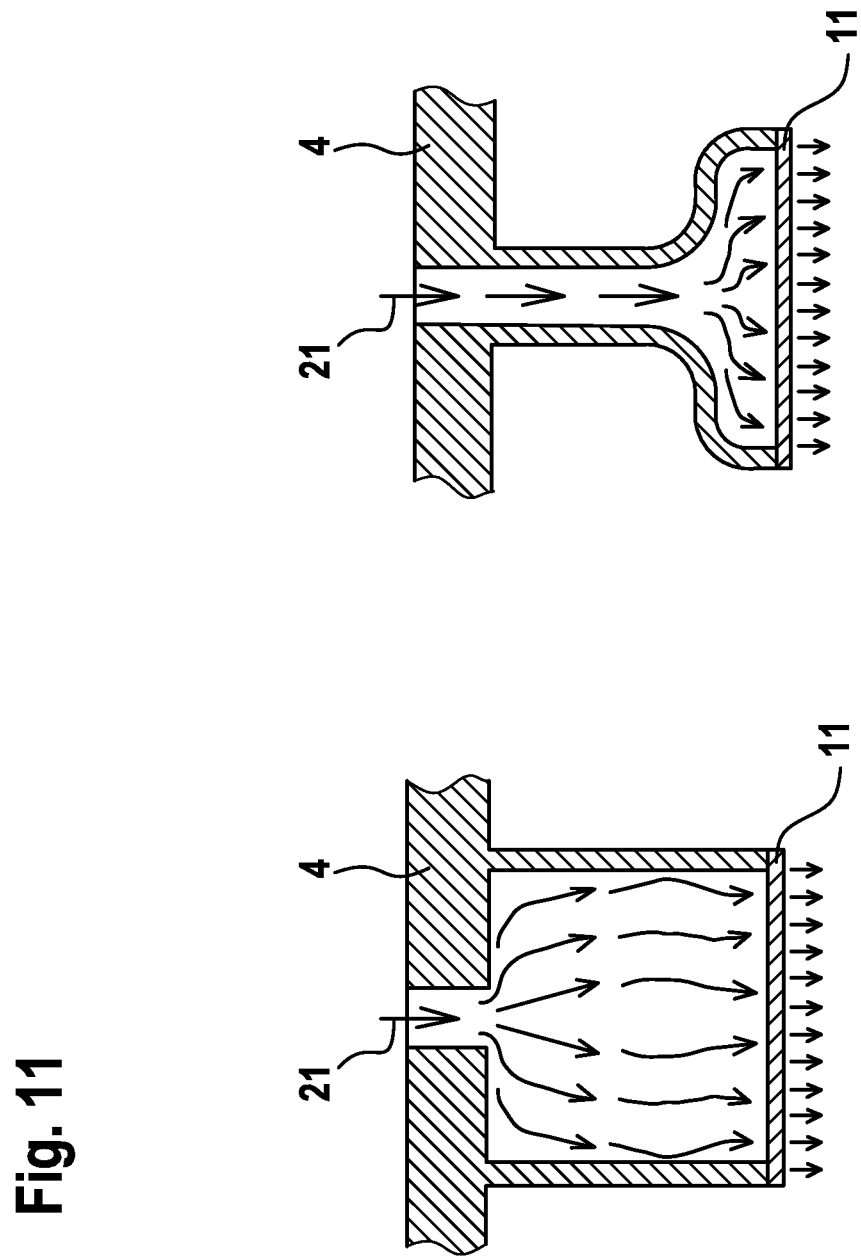

FOOD PRODUCT FORMING APPARATUS AND PROCESS

CLAIM OF BENEFIT OF FILING DATE

The present application claims the benefit of the filing date of PCT Application Serial No. PCT/EP2009/004676 (filed Jun. 29, 2009) (Published as WO 2010/000430) and EP 08012165.0 (filed Jul. 04, 2008), the contents of which are hereby incorporated by reference in their entirety.

BACKGROUND OF THE INVENTION

The present invention is related to a food product-forming apparatus, with a movable form-body, in which the food product is formed, and a knock out cup, which executes a knock-out-movement, that removes the food product from the form-body, whereas the knock out cup comprises an at least partially permeable bottom, through which a fluid-medium can be ejected. The present invention furthermore comprises a process for the production of food products.

Food product forming apparatus are known from the state of the art. This apparatus comprises a knock out cup that is moving through holes in a rotating drum, to knock out the product, for example, food products formed in the drum. After the knock out cup hits the food product, the food product sticks at least partially at the surface of the knock out cup. In order to remove the product from the knock out cup, air, supplied at a high pressure up to 6 bar, which is expanded rapidly, is used to blast the product from the knock out cup. In many cases water is additionally needed to remove the product from the knock out cup. This apparatus has the disadvantages that it is noisy, that the water creates pick up problems of the product, that the product will not drop straight from the knock out and that it is difficult to divide the water evenly among several knock out cups.

BRIEF SUMMARY OF THE INVENTION

It was therefore the objective of the present invention to provide a food product-forming apparatus and a process to overcome the problems according to the state of the art.

The problem is solved with a food product-forming apparatus, with a movable form-body, in which the food product is formed, and a knock out cup, which executes a knock-out-movement, that removes the food product from the form-body, whereas the knock out cup comprises an at least partially permeable bottom, through which a fluid-medium can be ejected and whereas, during the knock out movement a fluid-medium-cushion is created at least temporarily beneath the permeable bottom.

The present invention deals with a food product forming apparatus. A food product according to the present invention can be any product made of an eatable product for example meat, dough, vegetables, fruit or the like or a combination thereof. The food products may have 2D-shape, i.e. a shape whose height is constant or a 3D-shape.

This apparatus comprises a form body in which the food product is formed, for example a reciprocating plate or a rotating drum. This body comprises one or more holes, in which the food product is formed. Preferably a multitude of food products are formed simultaneously.

The food products are removed from the form body with a knock out cup, which reciprocates during one cycle from a start-into a knock-out-position and back. Preferably, the knock out cup moves free and not within a housing. The stroke length of the knock out cup is adjustable. At its bottom, i.e. at the surface next to the food product, the knock out cup comprises an at least partially permeable surface through which a fluid medium can be pressed. This surface is made for example by drilling holes into the surface, preferably with a laser, water-jet cutting and/or spark erosion. The surface is preferably a sintered porous material, for example metal, plastic and/or ceramics. More preferably, the surface is anti-adhesive regarding the product to be knocked out. The surface is connected to a source that provides the fluid medium. The fluid medium is pressed through the permeable surface. Due to the essentially homogenous flow resistance of the permeable surface, the fluid medium is spread evenly over the permeable part of the bottom.

The fluid medium is preferably air, water and/or water-vapor. The medium, especially the air can have a temperature above ambient temperature, preferably a temperature between 40 and 90° C.

During the knock out movement a fluid-medium-cushion is created at least temporarily beneath the permeable bottom. A fluid medium cushion according to the present invention is a volume outside the knock out cup, adjacent to the permeable bottom surface, in which the ejected medium has a pressure above ambient pressure. Preferably, the cushion is created by ejecting fluid medium out of the perforated bottom more preferably over an extended period of time. The cushion can be of any shape. Preferably it is a thin film, which can have an irregular shape. Preferably, this cushion is existent before and/or while the knock out cup touches the food product. This cushion at least reduces the tendency of the food product to stick to the surface of the knock out cup. Preferably, the cushion extends at least over the entire permeable area.

The cushion can be generated by ejecting the fluid medium out of the permeable bottom. The flow of the medium can continuously and/or intermittently.

Preferably the permeable bottom is a plate which is fixed to the knock out cup. Preferably the permeable bottom has a 2D-, i.e. has a constant thickness, or 3D shape.

In a preferred embodiment of the present invention, knock-out cup comprises a sidewall with an anti adhesive coating. This coating can be for example Teflon, Miropen or a coating with a nanostructure. In general, the anti adhesive coating reduces the amount of food-product that sticks to the sidewalls of the knock out cup.

Preferably, the knock out cup is connected to at least a cleaning fluid source, that cleans the side walls and/or the bottom of the knock out cup. Preferably, this cleaning fluid is air, which has ambient temperature or is hot and/or hot water and/or hot vapor. The cleaning fluid either circulates through the knock out cup and thus for example, heats and cleans the sidewalls and/or the bottom at their product-contacting surface and/or penetrates the sidewalls and/or the bottom for cleaning purposes. Different cleaning fluids can clean different parts of the knock out cup, respectively.

Preferably, the cleaning fluid will also clean at least partially the surface of the holes in the forming body after the food product has been knocked out.

Preferably, the knock-out cup comprises a at least partially permeable sidewall through which a cleaning fluid can be pressed. This surface is made for example by drilling holes into the surface, preferably with a laser, waterjet cutting and/or spark erosion. The sidewall is preferably a sintered material, for example metal, plastic and/or ceramics. More preferably, the sidewall is anti-adhesive regarding the product to be knocked out. The surface is connected to a source that provides the cleaning medium. The fluid medium is pressed through the permeable surface. The cleaning fluid can be air, vapor, water or any other cleaning fluid suitable for food processing applications.

In another preferred embodiment, the food product-forming apparatus comprises means to release vapor and/or mist in the vicinity of the knock-out-cup, preferably in the whole knock out cup vicinity. This vapor/mist will wet the surface or the knock out cup at least partially and prevents sticking. The vapor/mist is preferably provided by ultrasonic sound means.

Another or a preferred embodiment of the present invention is a food product-forming apparatus, with a movable form-body, in which the food product is formed, and a knock out cup, which executes a knock-out-movement, that removes the food product from the form-body, whereas the knock out cup comprises a reservoir with compressed fluid, preferably essentially air. Thus, each knock out cup has its own reservoir, so that each knock out cup works under essentially identical conditions.

In this reservoir, the fluid needed to remove the food product from the knock out cup and/or to clean the knock out cup is stored and released when needed. Preferably, the reservoir is filled during its motion from the knock out- to the start-position and at least partially emptied. Preferably, all reservoirs are filled and emptied simultaneously. Preferably, the inventive apparatus has only one source to fill the reservoir.

Preferably each reservoir comprises sealing means.

The stated problem is also solved by a process to form food products with a food product-forming apparatus, with a movable form-body, in which the food product is formed, and a knock out cup, which executes a knock-out-movement, that removes the food product from the form-body, whereas a fluid-medium can be ejected via the bottom of the knock out cup and that a during the knockout movement a fluid-medium-cushion is created at least temporarily beneath the permeable bottom.

The disclosure made for the inventive apparatus also applies to the inventive process and vice versa.

Preferably, the fluid-medium-cushion is provided before the knock out cup comes in the vicinity of the food product, preferably before it hits the food product. Thus, the ejection of the fluid medium preferably starts and more preferably continues before the knock out cup hits the food product and most preferably maintains until the knock out motion of the knock out cup has reached its end-point.

Preferably after the knock-out of the food product, at least one cleaning medium is preferably ejected out of the knock-out cup, more preferably through the bottom and/or a sidewall of the knock out cup. Different cleaning fluids can be applied for different regions of the knock out cup.

Preferably, vapor and/or mist is released in the vicinity of the knock-out-cup.

BRIEF DESCRIPTION OF THE DRAWINGS

The inventions are now explained according to the figures. The explanation applies to all inventions. The explanation does not limit the scope of the present invention.

FIG. 7 shows the food product forming apparatus and a transportation belt.

FIG. 11 shows another cleaning mode of the knock out cup.

DETAILED DESCRIPTION OF THE INVENTION

Figure 1:
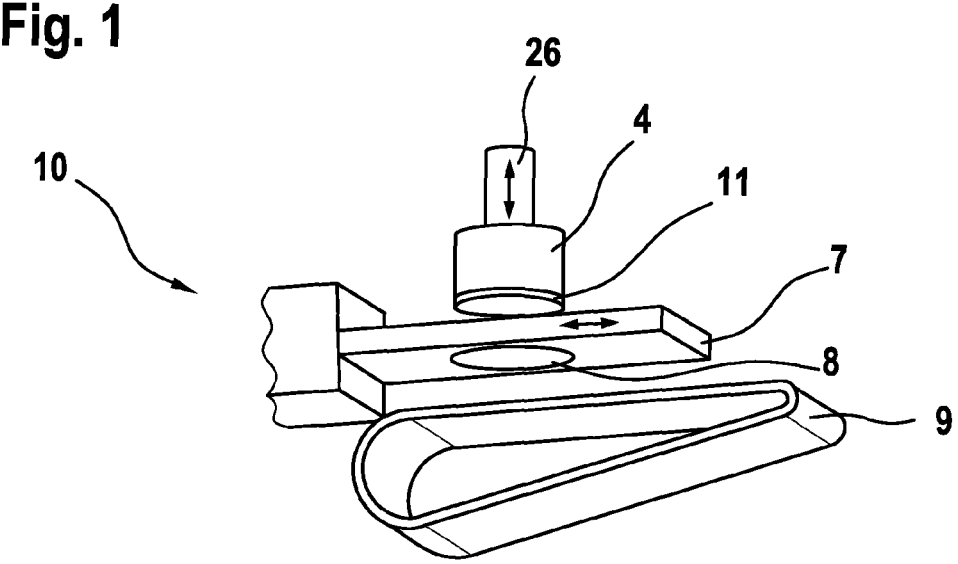
FIGS. 1 and 2 show one embodiment of the inventive forming apparatus.
Figure 2:
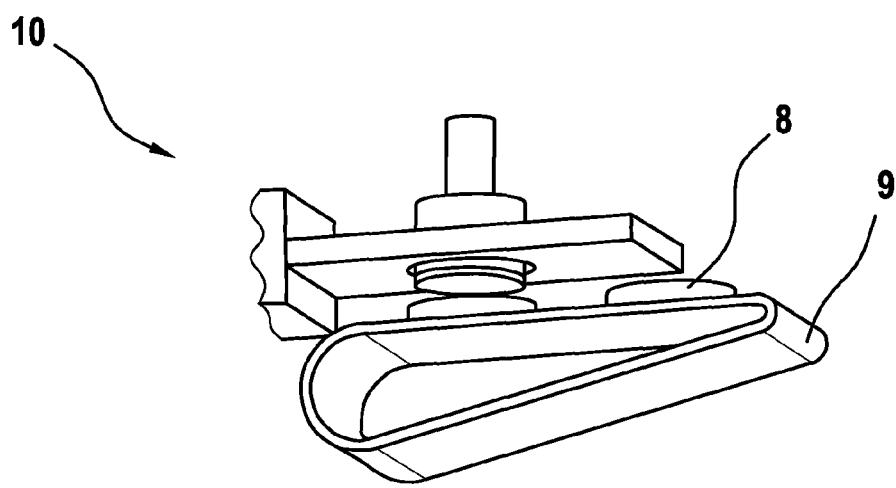

FIGS. 1 and 2 show the inventive forming apparatus 10. This forming apparatus 10 comprises a forming plate, which reciprocates between a filling-position in which the holes in the plate 7 are filled with the food product-product and a knock-out-position in which the formed food products 8 are removed out of the plate. The movement of plate 7 is depicted by the double arrow on the plate. FIGS. 1 and 2 depict the knock out position of the plate. The inventive apparatus 10 further comprises a knock out cup 4 which is connected to a piston 26. The knock out cup 4 moves from a start-position to a knock-out-position and back as shown by the double arrow on piston 26. The knock out cup 4 comprises at its bottom a perforated plate 11 which is permeable for a fluid medium. FIG. 1 shows the knock out cup in its start position. FIG. 2 shows the knock out cup after it has come into contact with the food product 8 in plate 7 and after it has moved through plate 7 and has knocked out the food product 8 out of plate 7. After the food products 8 have been removed from plate 7, they fall on a transportation belt 9 and are transported to the next processing step. The person skilled in the art understands, that plate 7 can comprise a multitude of holes and correspondingly a multitude of knock out cups. The knock out cup can be driven individually or together in groups. The person skilled in the art furthermore understands that plate 7 can be substituted by a intermittently or continuously rotating drum with holes in it. In this case, the knock out cups are located preferably at the inside of the drum.

Figure 3:
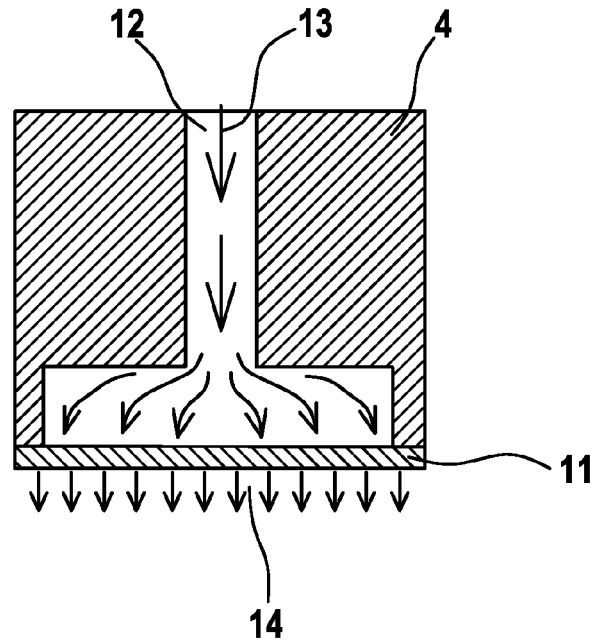
FIG. 3 shows an embodiment of the knock out cup.

FIG. 3 shows the knock out cup 4 according to FIGS. 1 and 2. It can be seen that a permeable plate 11 is attached to the bottom of the knock out cup and that this permeable plate is fluid-wise connected to a channel 12 through which a fluid medium 13, for example air and/or vapor can be guided towards the permeable plate 11. This fluid medium 13 flows through the permeable plate and is, due to the relatively high pressure-loss of the permeable plate 11, distributed essentially evenly over the surface of the permeable plate and creates a fluid cushion 14 under the permeable plate. This fluid cushion 14 is characterized by a higher pressure than the ambient pressure around knock out cup 4 and/or by a fluid motion caused by the air ejected out of the permeable plate 11. The flow of medium 13 can be continuously or intermittently.

Figure 4:
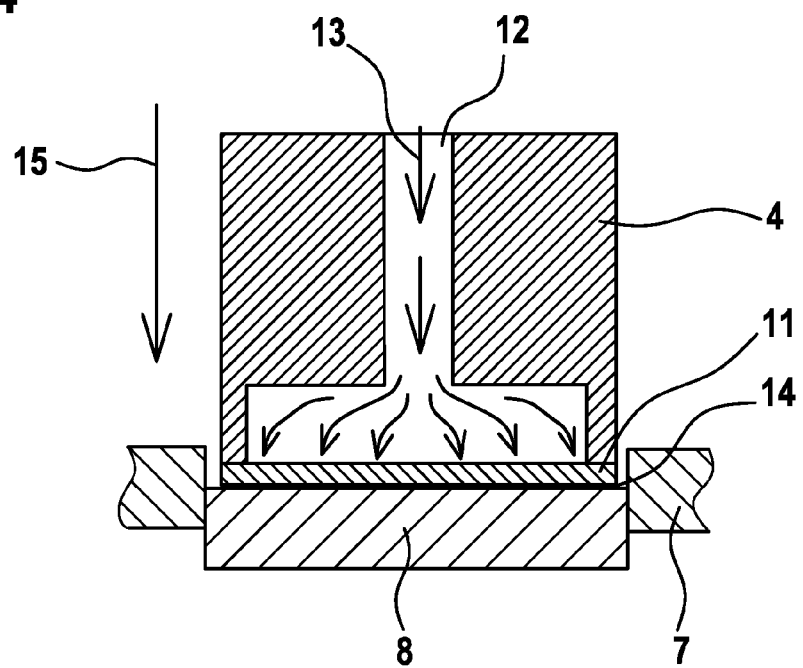
FIG. 4 shows the interaction between the knock out cup and the food product.

FIG. 4 shows the interaction between the knock out cup 4 and the food product 8. The knock out movement of the knock out cup 4 is depicted by arrow 15. Before knock out cup 4 hits food product 8 and preferably while the knock out cup 4 ejects the food product 8 out of plate 7, the fluid medium 13 is ejected out of plate 11 and creates a fluid medium cushion 14 between the knock out cup 4 and food product 8. Cushion reduces preferably prevents that food product-material sticks to the bottom of the cup. Thus, the imprint of the knock out cup and/or the deformation of the formed product during the knock out is reduced. Furthermore, the invention has the advantage, that less noise is created and that less or no water is needed to knock the food products 8 out of plate 7. The formed product 8 falls straight in the direction of the out feed belt. By achieving a straight drop of the product 8 on the out feed belt 9, the belt load can be increased, because the knock out works more accurately.

Figure 5A:
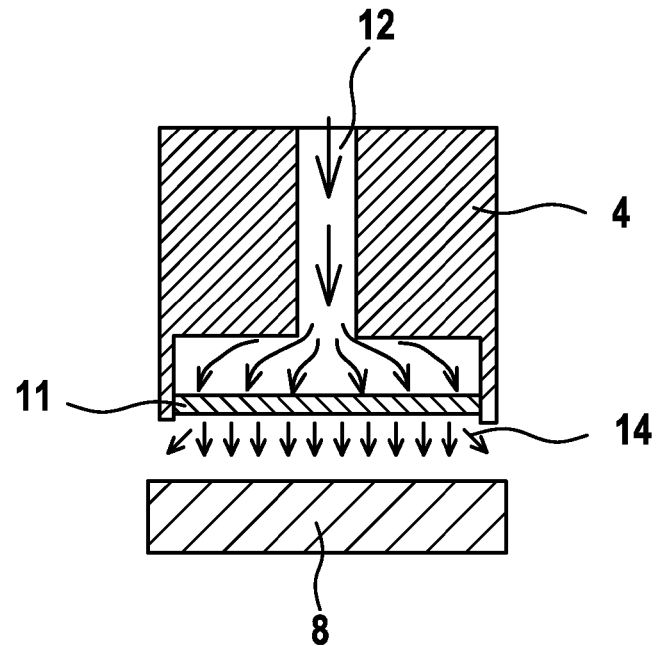
FIGS. 5*a*-5*f* show different embodiments of the knock out cup.
Figure 5B:
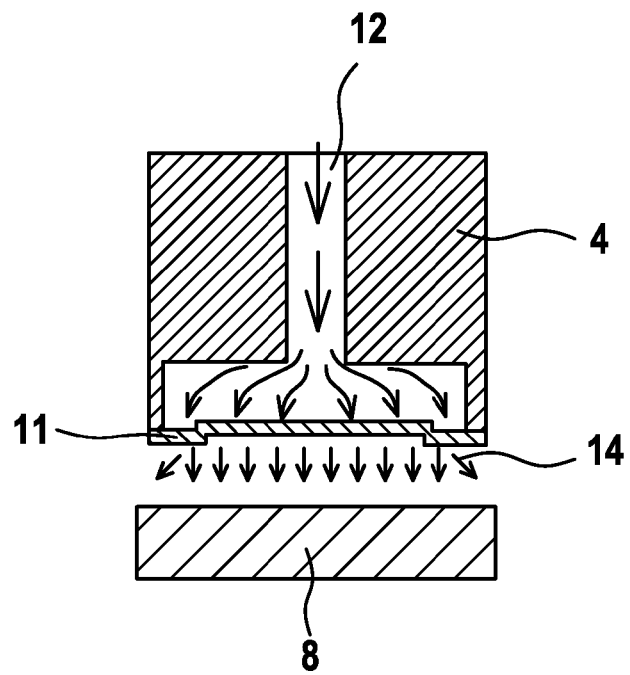
Figure 5C:
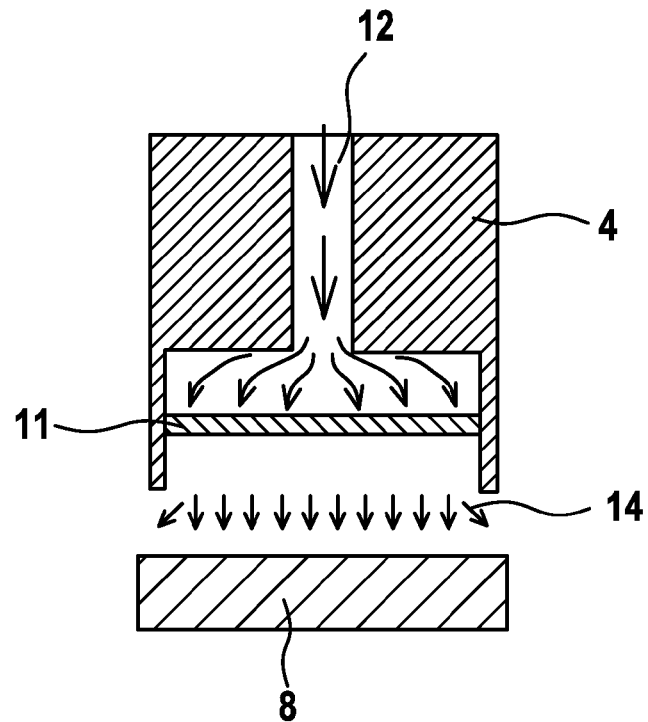
Figure 5D:
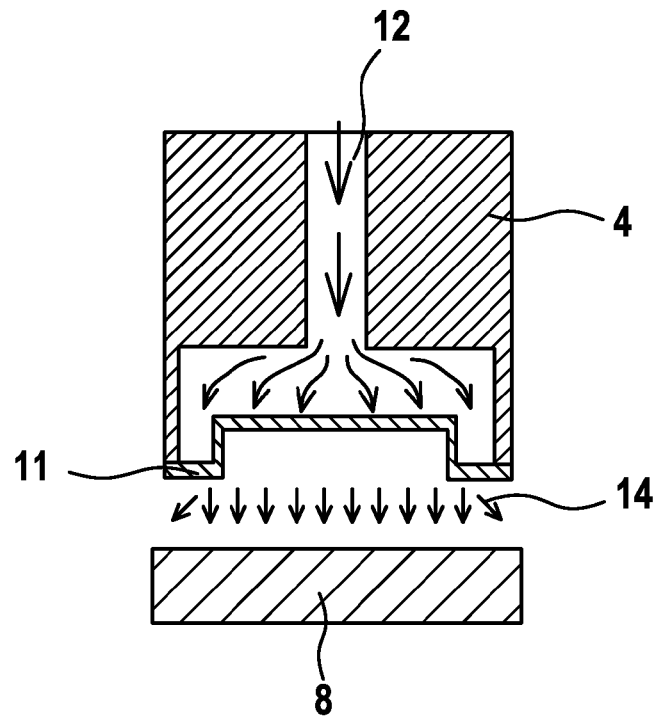
Figure 5E:
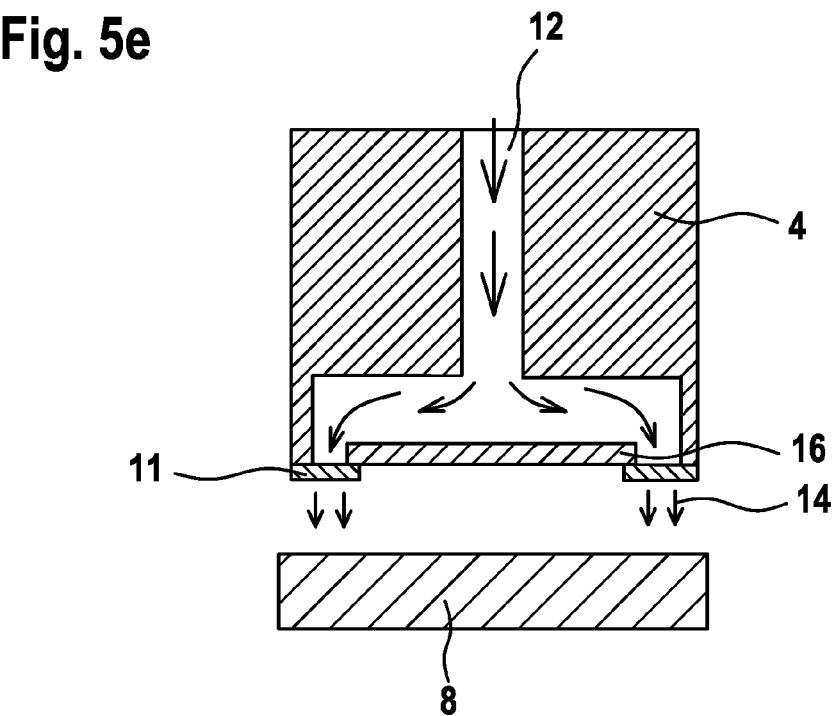
Figure 5F:
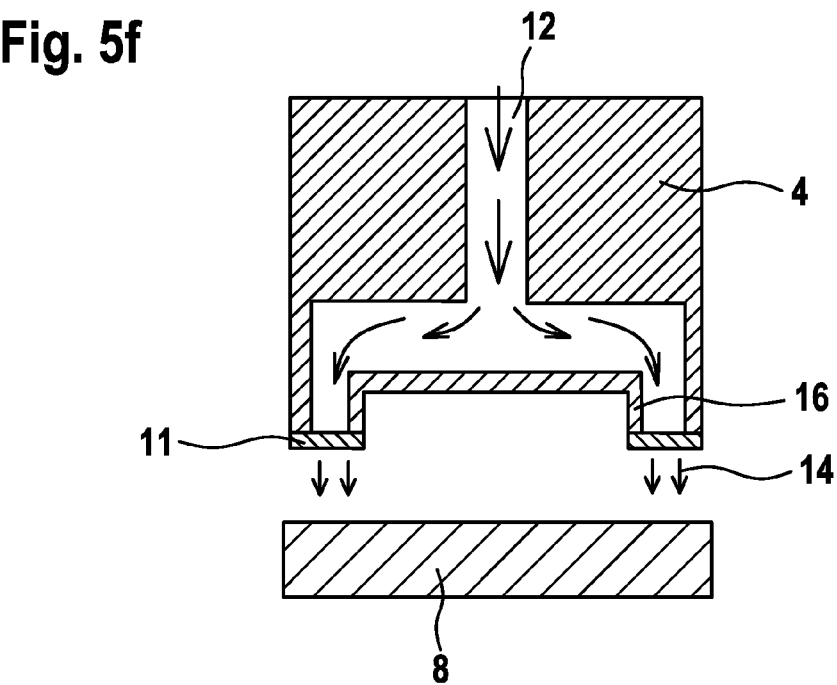

FIGS. 5*a*-5*f* show different layouts of the knock out cup 4, especially the permeable plate 11. All designs have in common that a fluid medium cushion 14 is created at least under the permeable part of the plate that is in fluid-contact with the fluid channel 12. Depending on the product mix and/or the product temperature different designs of the bottom part of the knock out cup can be desirable. FIG. 5*a* shows a permeable plate, which is slightly embedded into the sidewalls of the knock out cup. FIG. 5*b* shows a 3-dimensionally formed bottom plate 11. FIG. 5*c* shows, in comparison to FIG. 5*a*, a knock out cup with a permeable bottom plate that is more embedded into the sidewalls of the knock out cup. FIG. 5*d* also shows a 3-dimensionally formed bottom plate 11. FIGS. 5*i* and 5*f* show bottom plates which are only partially permeable. The bottom plate 11 comprises a part 16 which is not permeable for the fluid medium 13.

Figure 6A:
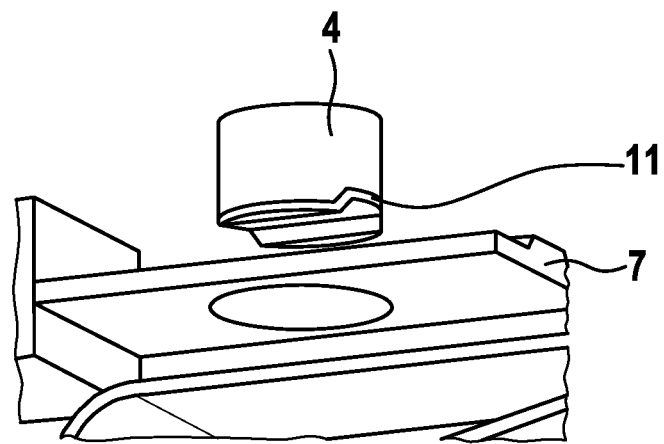
FIGS. 6*a*-6*d* show another embodiment of the inventive forming apparatus.
Figure 6B:
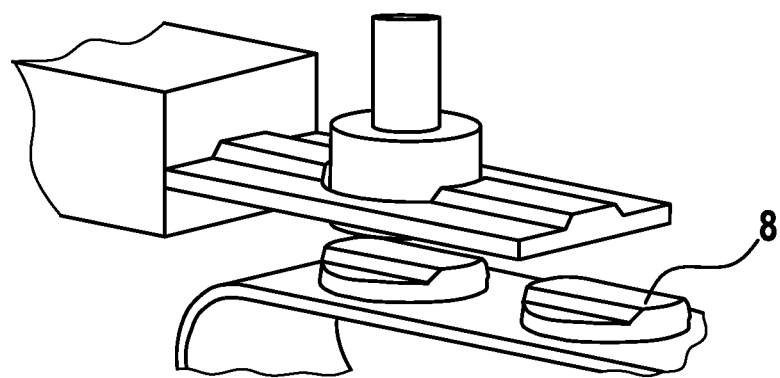
Figure 6C:
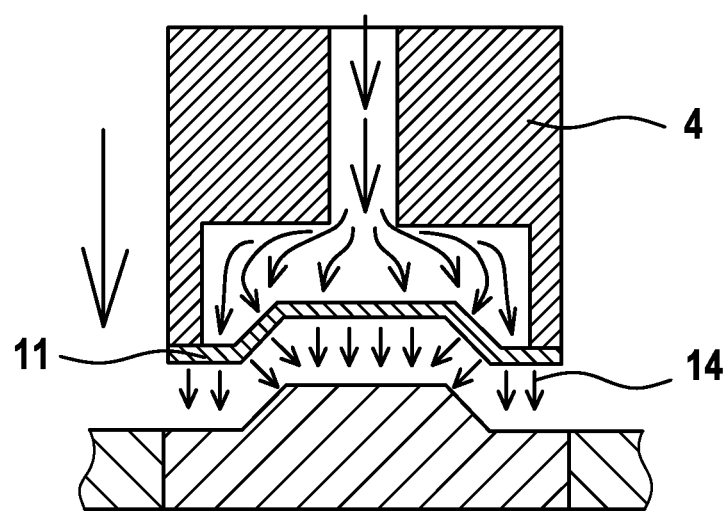
Figure 6D:
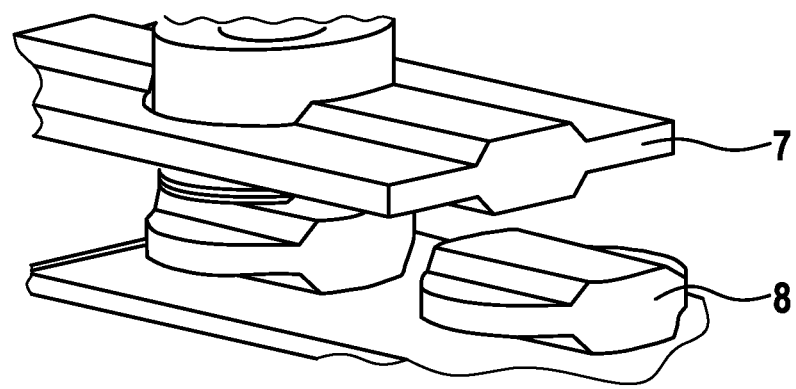

FIGS. 6*a* and 6*d* show an embodiment of the inventive food product forming apparatus to produce 3-dimensionally formed food products 8. In this case, the plates 7 as well as the bottom plate 11 are 3-dimensionally shaped.

FIG. 7 shows the inventive food product forming machine. It can be clearly seen that during the knock out movement of the knock out cup 4, it is pushed through plate 7 and that a fluid medium cushion 14 is created between the bottom plate 11 and food product 8 before and while the respective food product 8 is knocked out. The food products fall on a transportation belt 9 and are transported to the next processing step. Due to the improved knock out of food products 8, the distance between plate 7 and the transportation belt 9 can be reduced, because the food products 8 drop straight downwards and not deformed on belt 9. Thus, the production rate of the apparatus can be increased and the impact on the food products during knock out is reduced.

Figure 8:
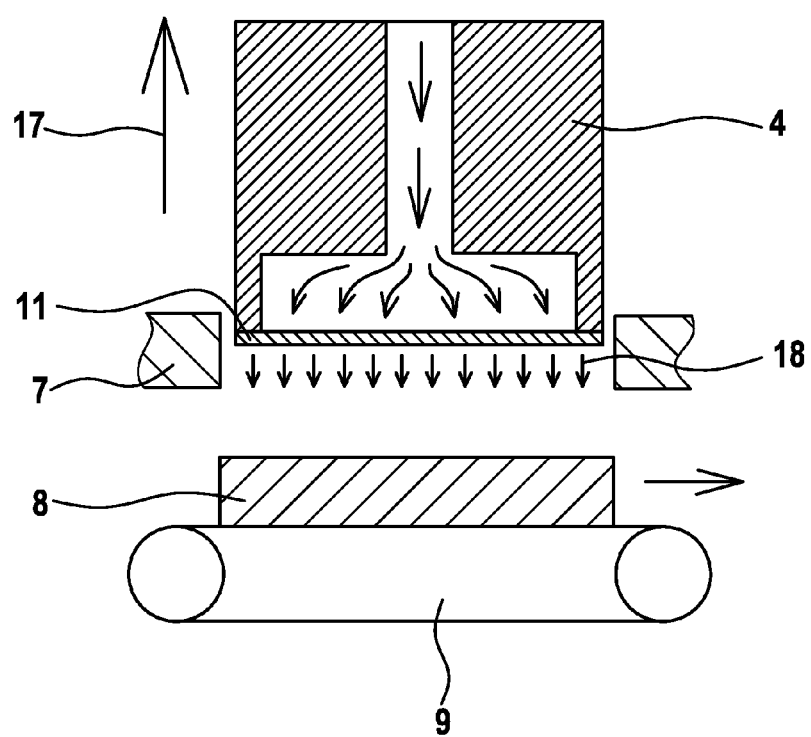
FIG. 8 shows the cleaning mode of the inventive food product forming apparatus.

FIG. 8 shows the knock cup during its movement in the withdrawal direction i.e. towards its start-position. This movement is depicted by arrow 17. During this upward movement, the fluid-flow of the fluid 13 is maintained in order to clean the permeable plate 11. Thus, food product particles which might stick to the permeable plate are removed, so that the knock out cup is clean for its subsequent knock out.

Figure 9:
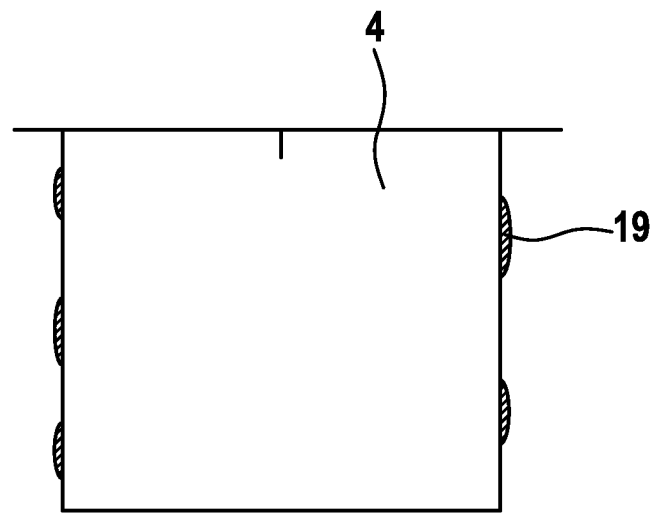
FIG. 9 shows a contaminated knock out cup.

FIG. 9 shows a knock out cup which is contaminated with food product material 19 at its sidewall. Such a contamination is not desirable for maintenance- and hygienic-reasons.

Figure 10:
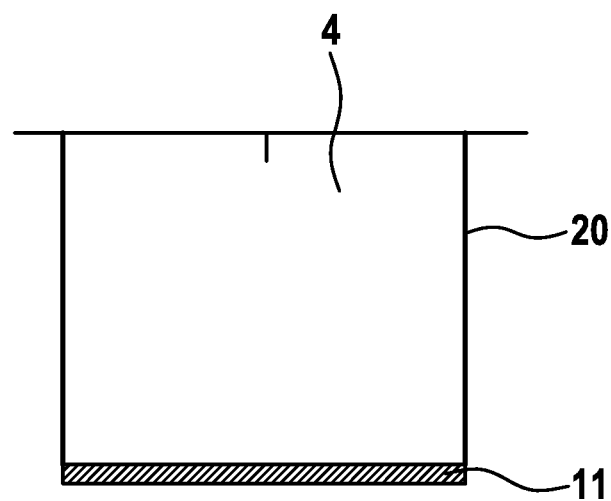
FIG. 10 shows a knock out cup with an anti-adhesive coating at the sidewalls.
Figure 12A:
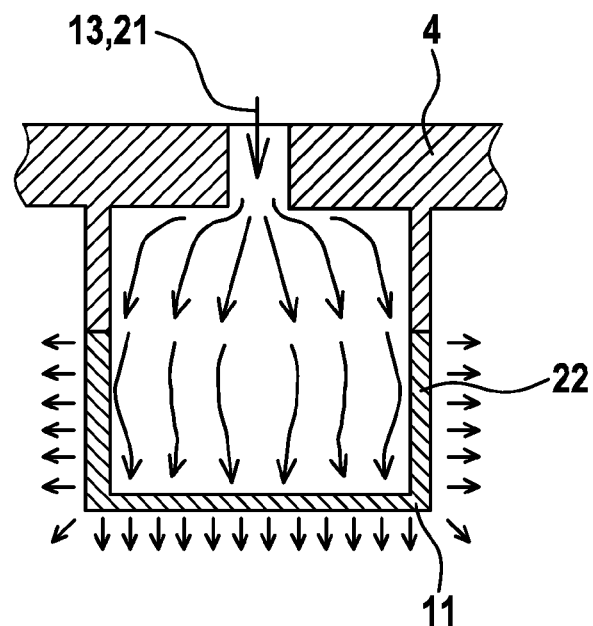
FIGS. 12*a*-12*k* show yet other embodiments of the knock out cup.
Figure 12B:
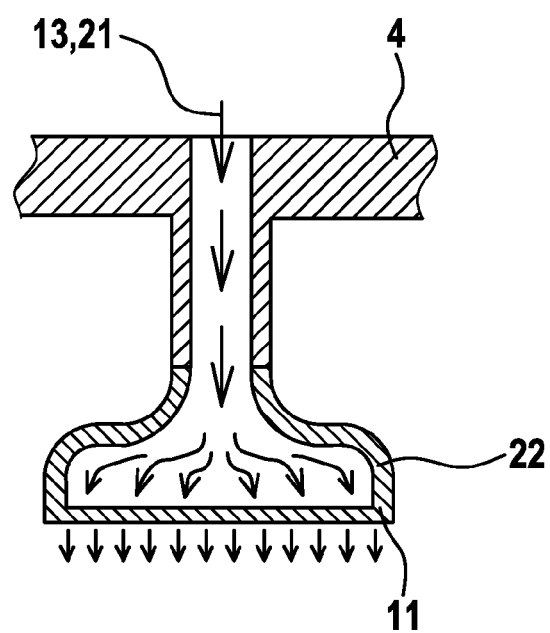
Figure 12C:
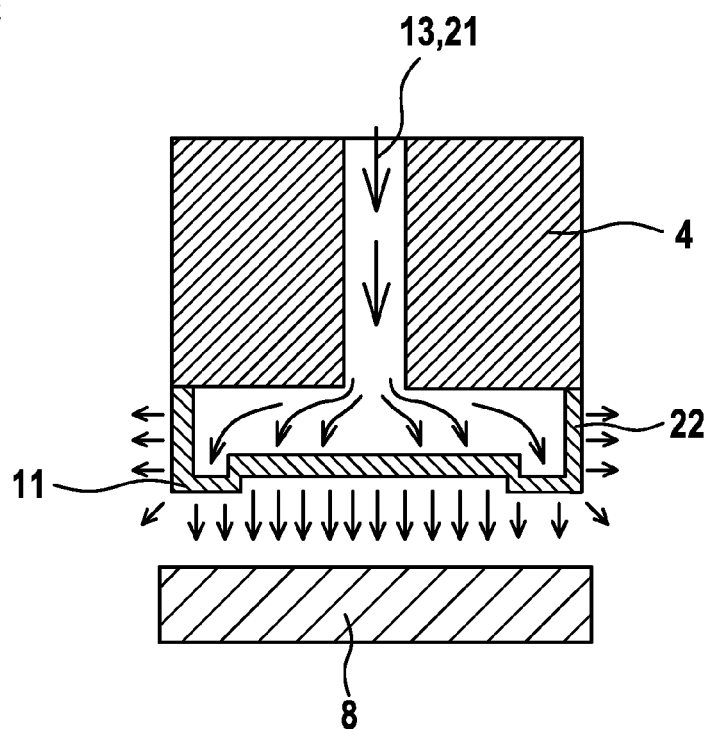
Figure 12D:
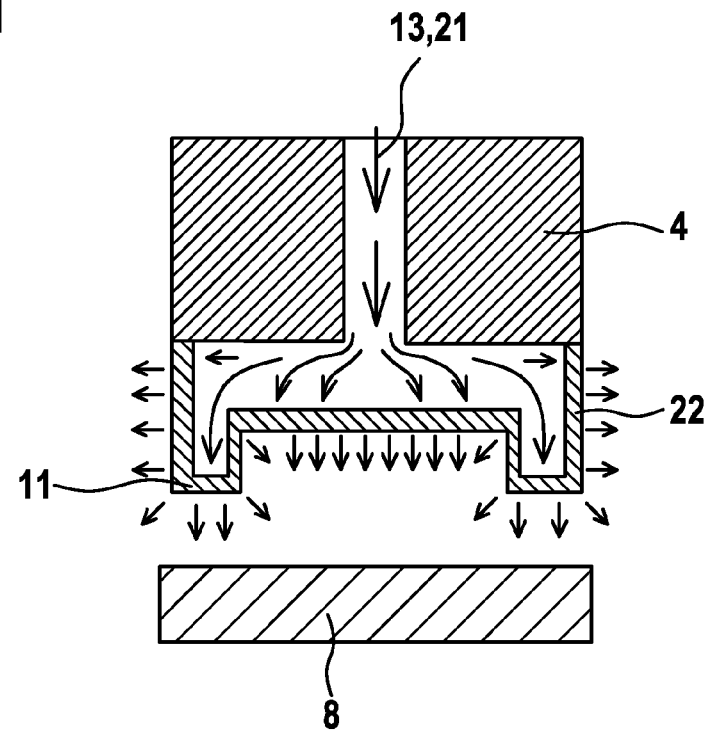
Figure 12E:
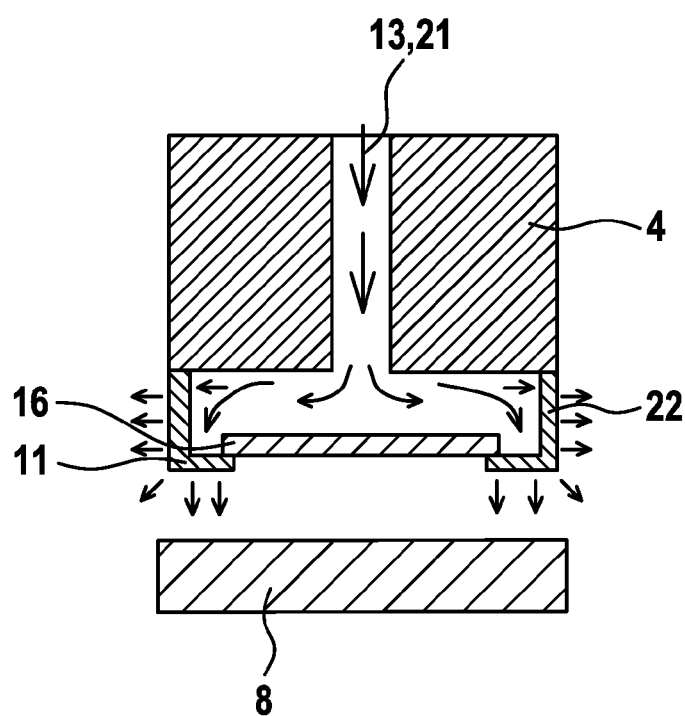
Figure 12F:
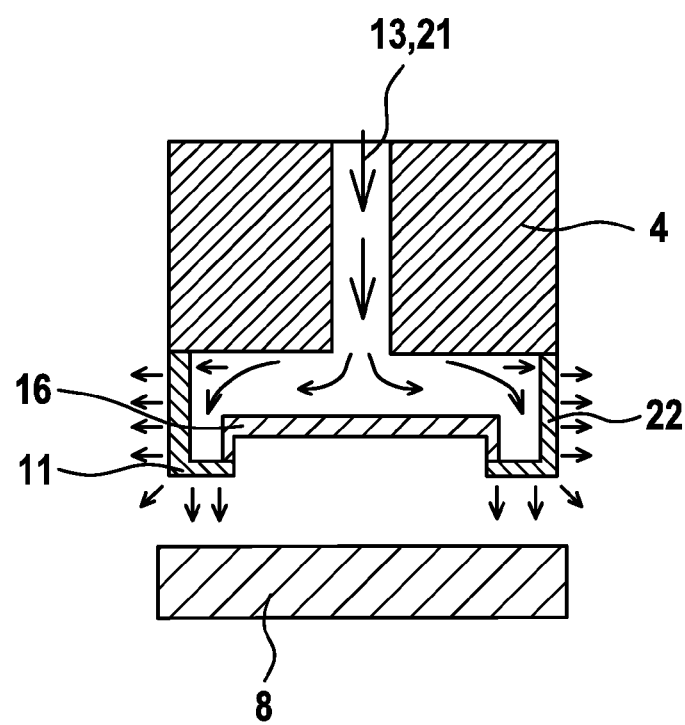
Figure 12G:
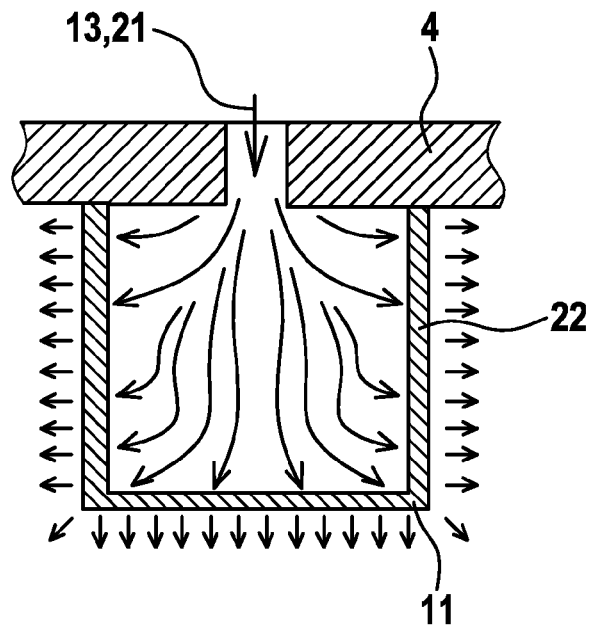
Figure 12H:
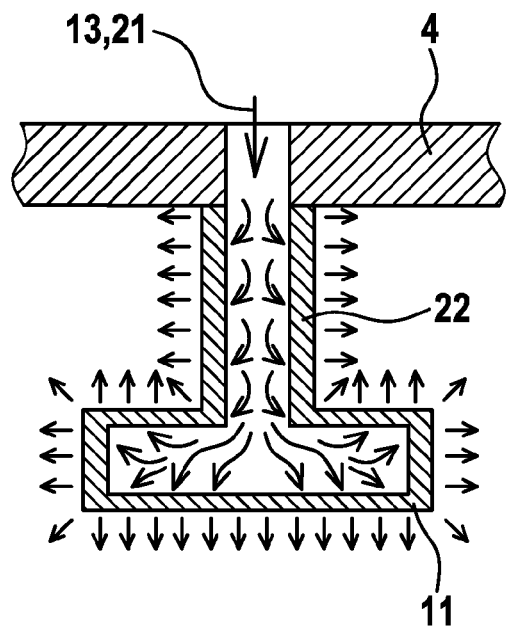
Figure 12I:
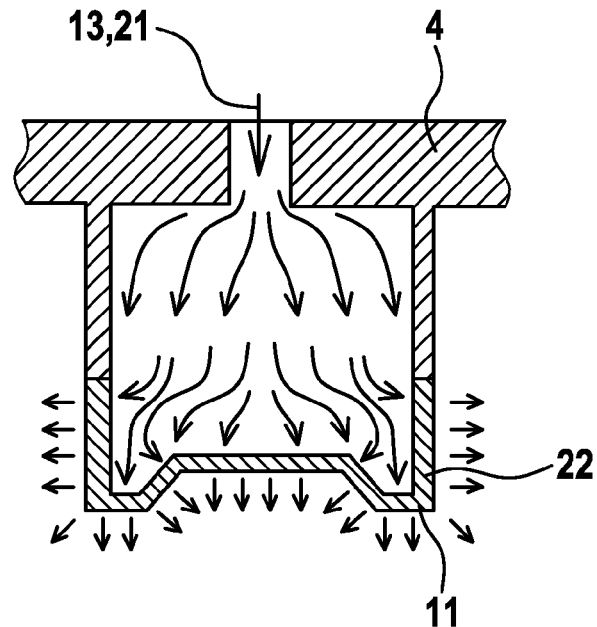
Figure 12J:
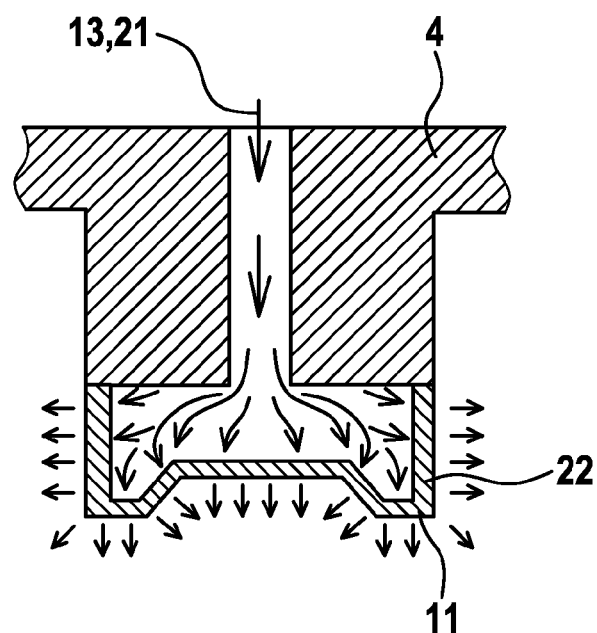
Figure 12K:
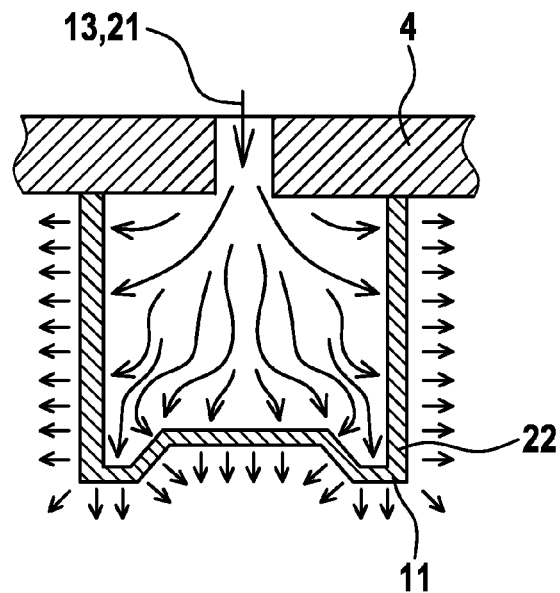

In order to avoid the contaminations shown in FIG. 9, the knock out cup 4 according to FIG. 10 comprises an anti-adhesive-coating 20 at its sidewalls. This coating reduces preferably prevents contaminations of the sidewalls. The coating can be Teflon or a coating comprising a nano-structure or any other treatment that reduces the tendency of the food product to stick at the sidewalls.

FIG. 11 shows a preferred embodiment of the inventive food product forming machine, whereas, the knock out cup 4 is connected to a cleaning medium 21. The cleaning medium can be identical with the fluid medium 13. This cleaning medium 21 can be for example a hot cleaning medium e.g. hot air and/or hot vapor that flows through the knock out cup 4 and the permeable bottom 11. In case of a hot cleaning medium, the inventive food product forming machine comprises heating means which heats the fluid 21 preferably to a maximum temperature of 90°. The temperature depends on the product-mix used as the food product material. Preferably the knock-out cups are made of a thin material more preferably with a good thermo conductivity. The cleaning medium 21 will heat up the sidewalls of the cup and the heated walls will liquefy fat in the product which sticks to the sidewalls of the cup so that these contaminations will be removed from the sidewalls or the sticking of the contamination to the sidewalls will be prevented.

FIGS. 12*a*-12*k* show yet another embodiment of the present inventions i.e. a knock-out cup which comprises a sidewall with a permeable region 22. Through this permeable section 22 of these sidewalls a fluid medium 13 and/or a cleaning medium 21 can be ejected independently or together with the ejection of a fluid medium 13, 21 through the permeable plate 11. The ejection of medium 13, 21 through the at least partially permeable sidewalls 21 have the advantage, that these sidewalls are at least partially cleaned and/or that the circumference of the holes in the plate 7 are cleaned during the knock-out- and/or the withdrawal-movement of the knock-out cup 4.

Figure 13:
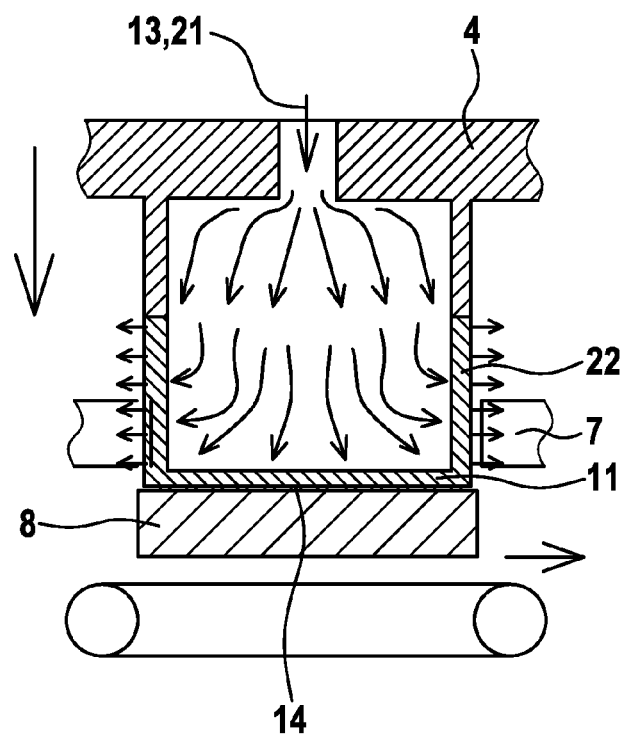
FIG. 13 shows another embodiment of the food product forming apparatus.

This is further explained according to FIG. 13. During the knock out movement of the knock out cup 4, the position in FIG. 13 is the ideal position to turn the direction of the movement. The flow of the medium out of the permeable sidewall 22 preferably takes place at least temporarily during movement to this position, during the turn of direction and at least temporarily during the movement back to the start position. At the bottom of the cup a cushion 14 of medium is formed to improve the discharge of the formed food product 8 from plate 7. Out of the sidewall medium 13 is discharged to prevent contamination of the sidewalls. In the position according to FIG. 13, the medium 13 also cleans the inner walls of the openings of the form plate 7. The cleaning of the inner walls of plate 7 will make the removals of food products from the forming plate easier. Furthermore, it is possible to moist the inner walls of the form plate 7 with vapor and/or mist which is blown through the permeable region 22 of the side walls onto the inner walls of the openings in plate 7.

The knock-out drive is preferably position driven. A different thickness of the form plate means an/or another height of the permeable region 22 will preferably result in a different stroke length. A position driven knock out cup for examples results in a higher production speed. In case the form plate is thinner, the movement of the knock out cup can be reduced.

Figure 14A:
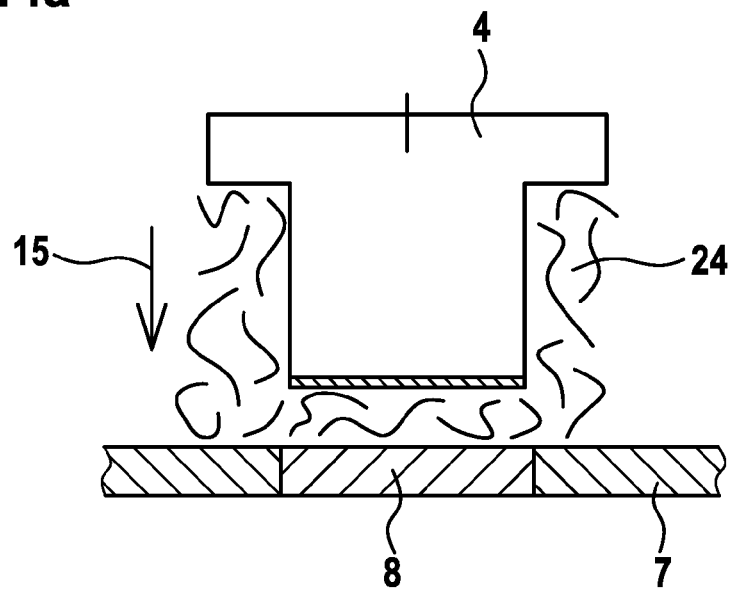
FIGS. 14*a*-14*b* show mist around the knock out cup.
Figure 14B:
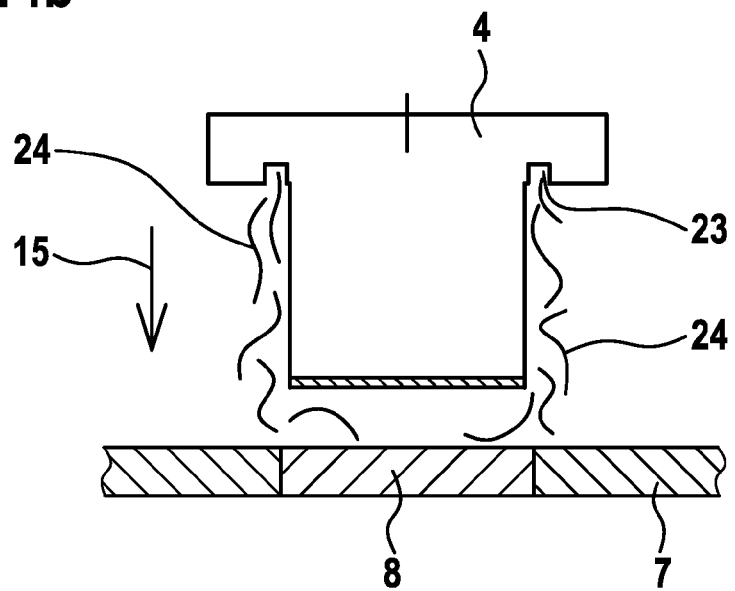

FIG. 14 shows yet another embodiment of the present invention. In this case, the knock out cup 4 is surrounded with mist and/or vapor, this mist and/or vapor wets the sidewalls and/or the bottom of the knock out cup 4 at least partially and thus makes the knock out easier and contamination of the sidewalls are reduced. The knock out cup 4 according to FIG. 14 *b* comprises ejection means which are located at the circumference of the sidewall of the knock-out cup 4 and which eject vapor/mist 24.

Figure 15:
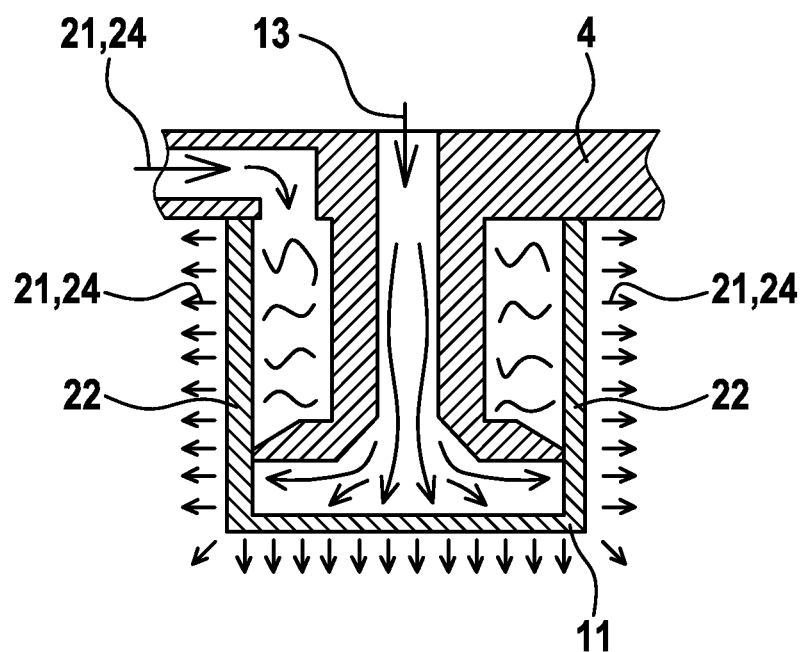
FIG. 15 shows yet another embodiment of the knock out cup.

FIG. 15 shows yet another embodiment of the knock-out cup 4. In this case the permeable region 22 of the sidewall is divided into two sections. One section is connected to the fluid medium 13, so that in this part of the medium is ejected out of this section of the permeable sidewalls and the permeable bottoms plate 11. The other section is connected to a cleaning medium 21 and/or to a vapor moisture and/or mist 24 in order to eject this medium out of this part of the permeable wall.

Figure 16:
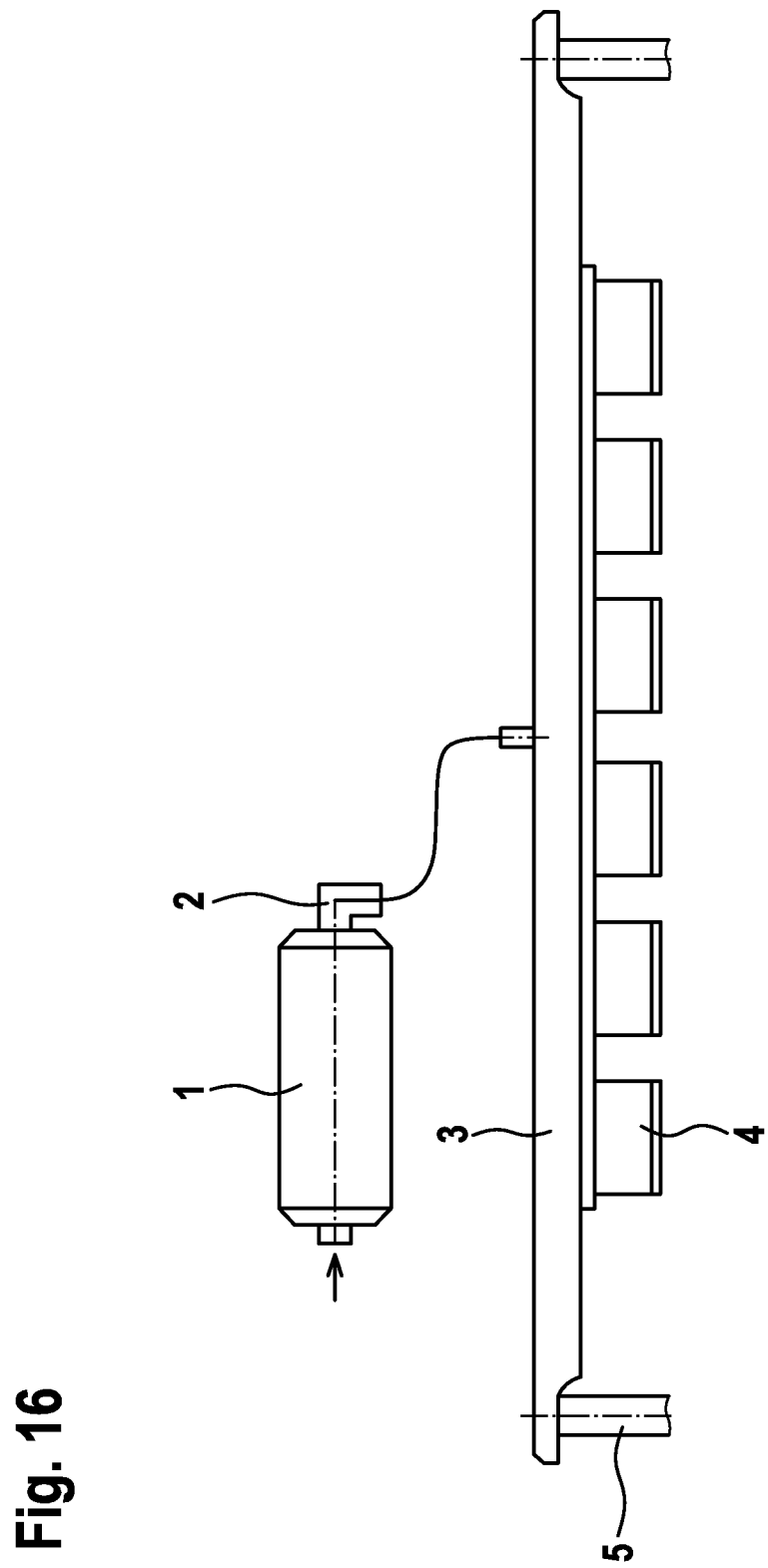
FIG. 16 shows another embodiment of the inventive food product forming machine.
Figure 17A:
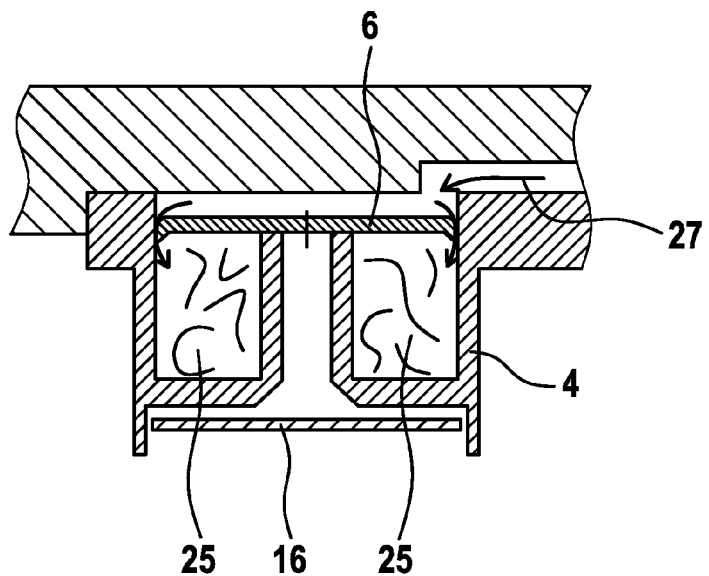
FIG. 17*a*-*d* show yet another embodiment of the knock out cup.
Figure 17B:
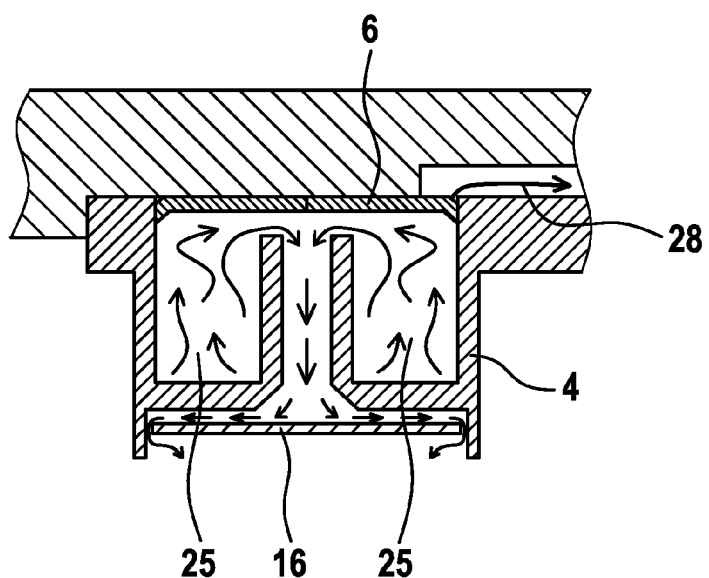
Figure 17C:
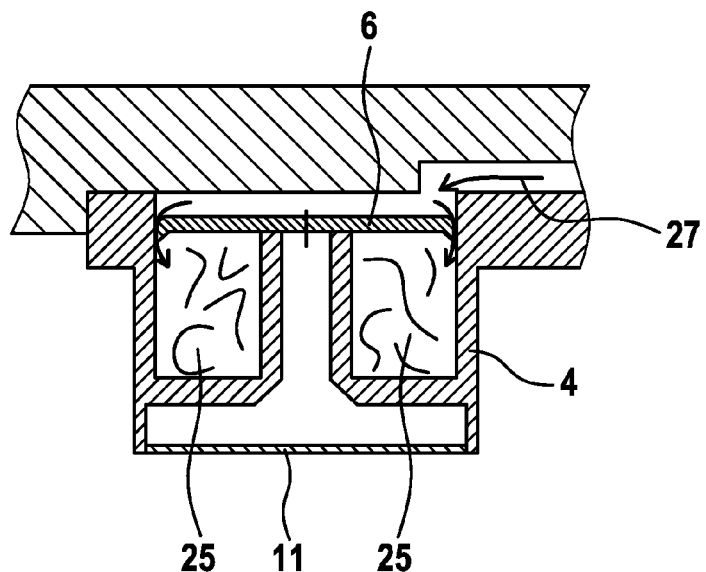
Figure 17D:
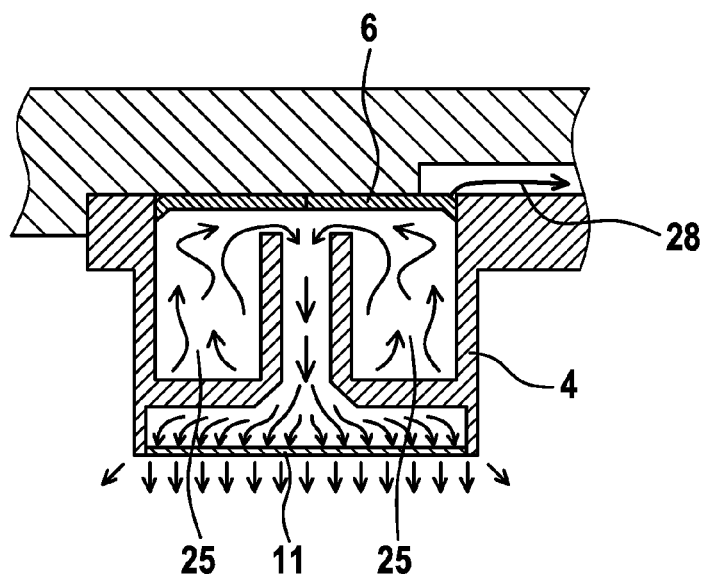

FIG. 16 shows yet another embodiment of the inventive food product forming machine. In this case, the food product forming machine comprises a vessel with a compressed medium, preferably compressed air. This vessel 1 is connected directly or indirectly via a valve 2 with each individual knock out cup 4. All knock out cups 4 are connected to a knock out bar 3 which is driven upwards and downwards by the knock out drive 5. The knock out bar 3 can also be used to fluid-wise connect with the knock out cups 4 with the compressed vessel 1. All knock out cups comprise at least partially perforated plates at their bottom, respectively.

FIGS. 17 *a-d* show another embodiment of the present invention. Each knock out cup 4 comprises a reservoir 25 for compressed air. This reservoir 25 is filled with a fluid, e.g. compressed air. The medium flows as depicted by the arrow 27 past a piston 6, which has a sealing-lip and it's circumference and flows into the reservoir 25. The piston 6 avoids that the medium flows out of the reservoir 26 as long as the pressure above the piston 6 is maintained.

The filling situation is depicted in FIGS. 17 *a, c* and preferably takes place while the knock out cup moves from it's knock out position to it's start position. The release of the pressurized medium in the reservoir 25 is shown in FIGS. 17 *b, d*. After the pressure above the piston 6 is reduced as depicted by arrow 28, the piston 6 moves upwards. This opens the connection between the reservoir 25 and the channel that connects the reservoir 25 with the bottom of the knock out cup 4 which comprises in this case a non-preferable plate 16 around which the pressurized medium flows.

The embodiment according to FIG. 17 *c* and *d* is essentially identical with the embodiment according to FIGS. 17 *a* and *b* with the exception, that the knock out cup 4 comprises a permeable plate 11.

LIST OF REFERENCE SIGNS

1 Vessel
2 Valve
3 Knock out bar
4 Knock out cup
5 Knock out drive
6 Sealing means for reservoir 25, piston
7 Form-body, Form-plate
8 Food product
9 Transportation means, belt
10 Forming apparatus
11 Permeable bottom, permeable bottom plate
12 Channel
13 Fluid medium
14 Cushion
15 Knock out movement
16 Non permeable bottom, Non permeable bottom plate
17 Withdrawal direction
18 Cleaning flow
19 Contamination
20 Anti-adhesive coating
21 Cleaning medium, hot cleaning medium
22 Permeable sidewall
23 Ejection opening
24 Moisture, vapor
25 Reservoir
26 Piston
27, 28 flow direction

What is claimed is:

1. A process to form food products comprising:
   forming a food product with a food product-forming apparatus comprising:
      a movable form-body, and
      a knock-out cup;
   removing the food product from the movable form-body with the knock out cup by executing a knock-out-movement, that reciprocates the knock-out cup so that the knock-out cup removes the food product from the form-body,
   ejecting a fluid-medium via a bottom of the knock-out cup before the knock-out cup comes in a vicinity of the food product,
   wherein during the knock-out-movement a fluid-medium-cushion is created at least temporary beneath a permeable bottom of the knock-out cup, and
   wherein the fluid cushion has a higher pressure than ambient pressure around the knock-out cup.

2. The process according to claim 1, wherein after the knock-out of the food product, at least one cleaning medium is ejected out of the knock-out cup.

3. The process according to claim 2, wherein the knock-out cup comprises a sidewall with an anti adhesive coating.

4. The process according to claim 1, further comprising ejecting a cleaning fluid through the bottom and/or a sidewall of the knock-out cup.

5. The process according to claim 1, further comprising ejecting at least one cleaning medium through the permeable bottom and/or through a permeable sidewall.

6. The process according to claim 1, wherein the food product forming apparatus comprises a means to release vapor and/or mist in a vicinity of the knock-out-cup.

7. The process according to claim 6, wherein the means is an ultrasonic sound means to provide the vapor and/or mist in the vicinity of the knock-cup.

8. The process according to claim 1, further comprising providing the fluid-medium-cushion before the knockout-cup hits the food product.

9. The process according to claim 8, wherein the permeable bottom has a 2D or 3D shape.

10. The process according to claim 8, wherein the knock-out cup does not move within a housing.

11. The process of claim 9, wherein ejecting the fluid medium continues until the knock-out-movement of the knock out cup has reached an end-point.

12. The process according to claim 1, wherein the knock-cup comprises a reservoir with a compressed fluid.

13. The process of claim 12, wherein during upward movement of the knock-out cup, flow of the fluid medium is maintained so that the permeable bottom of the knock-out cup is cleaned.

14. The process according to claim 1, wherein the fluid-medium-cushion exists while the knock-out cup touches the food product so that the fluid-medium-cushion prevents the food product from sticking to a surface of the knock-out cup.

15. The process of claim 14, wherein the fluid medium has a temperature between 40° C. and 90° C., and the fluid medium is ejected over an extended period of time.

16. The process of claim 1, wherein no water is included in the fluid medium.

17. A process to form food products comprising:
   forming a food product with a food product-forming apparatus comprising:
      a movable form-body, and
      a knock-cup having:
         a permeable bottom,
         a sidewall; and
         a reservoir;

removing the food product from the movable form-body with the knock-out cup by executing a knock-out-movement, that reciprocates the knock-out cup so that the knock-out cup hits the food product and removes the food product from the form-body;

ejecting a fluid-medium, over an extended period of time, via a bottom of the knock out cup before the knock-out cup hits the food product and continuing until the knock-out-movement of the knock out cup has reached an end-point;

creating a fluid-medium-cushion, during the knock-out-movement, so that the fluid medium is at least temporarily beneath the permeable bottom of the knock-out cup;

filling the reservoir during motion of the knock-out cup from a knock out position to a start position; and wherein the fluid cushion has a higher pressure than an ambient pressure around the knock-out cup, and the fluid medium has a temperature above an ambient temperature.

18. The process of claim 17, wherein the fluid medium has a temperature between 40° C. and 90° C.

19. The process of claim 17, wherein no water is used to knock the food products out of the movable form body.

* * * * *